United States Patent [19]
DeVore et al.

[11] Patent Number: 5,992,048
[45] Date of Patent: Nov. 30, 1999

[54] SOLAR DRYING PROCESS AND APPARATUS

[75] Inventors: Jack B. DeVore, Fayetteville; James E. Snow, Gentry, both of Ark.

[73] Assignee: The Board of Trustees of University of Arkansas, Little Rock, Ark.

[21] Appl. No.: 08/940,906

[22] Filed: Sep. 30, 1997

Related U.S. Application Data

[60] Provisional application No. 60/027,197, Sep. 30, 1996.

[51] Int. Cl.⁶ ........................................... F26B 19/00
[52] U.S. Cl. .................................. 34/522; 34/93
[58] Field of Search ............... 34/93, 215, 232, 34/201, 522

[56] References Cited

U.S. PATENT DOCUMENTS

| | | | |
|---|---|---|---|
| 4,432,147 | 2/1984 | Chen et al. ................................. | 34/46 |
| 4,490,926 | 1/1985 | Stokes ........................................... | 34/76 |
| 4,534,118 | 8/1985 | Cabus et al. ................................. | 34/34 |
| 4,831,747 | 5/1989 | Roos et al. ................................... | 34/54 |
| 4,862,599 | 9/1989 | Brunner ....................................... | 34/46 |
| 5,325,604 | 7/1994 | Little .......................................... | 34/493 |

*Primary Examiner*—Henry Bennett
*Assistant Examiner*—Pamela A. Wilson
*Attorney, Agent, or Firm*—J.M. Mark Gilbreth; Robert W. Strozier; Gilbreth & Strozier, PC.

[57] ABSTRACT

A drier with a curvalinear chamber having a heat transfer surface at one end and baffles at the other end. A fan is provided to circulate air within the chamber. In the process for drying, the product to be dried is positioned within the chamber and air circulated across the heat transfer surface, toward the baffle, past the product, and back to the heat transfer surface.

12 Claims, 5 Drawing Sheets

SOLAR DRYING PROCESS AND APPARATUS

RELATED APPLICATION DATA

This application claims priority from U.S. Provisional Application serial no. 60/027,197 filed on Sep. 30, 1996.

BACKGROUND OF THE INVENTION

1. Field of the Invention

The present invention relates to methods of and apparatus for drying. In another aspect, the present invention relates to methods of and apparatus for drying wood, to solar collectors, and to wood products. In even another aspect, the present invention relates to methods of and apparatus for solar drying of wood, to curvalinear solar collectors, and to dried wood products.

2. Description of the Related Art

Lumber is a necessary commodity in our society and is obtained from timber only after much processing. Historically, in order to get the timber from the forest to the consumer, the timber industry has had to deal with three separate operations that are sometimes miles apart, the logging operation, the sawing operation and the drying operation.

By its very nature, logging typically occurs in remote, hard to access areas, making it difficult to transport cut lumber away from the logging operation. Since early saw mills were big and cumbersome, not easily moved from place to place, and required large capital investment, a compromise location was selected in order to economically accommodate logging operations from more than one location.

Many years ago, the drying operation only required a large area to air dry, or season, the lumber. Later, kiln dryers were used, but these had to be physically connected to a power source of some type, the availability of the power source governing the placement of the kilns.

Moving the lumber from one operation to another has always been a problem. Early sawmills were situated on water ways. These water way locations were critical to the timber industry as the most practical way to transport newly cut timber to sawing operations, and to power the saws necessary for the sawing operation.

Through the years, with the invention of the gasoline engine, the discovery of electricity, the establishment of railways and many more inventions and discoveries, the timber industry gained the necessary resources to begin refining their operations. Sawmills became more portable and could be located in close proximity to the actual logging operations.

With the advent of wood drying kilns, cut lumber could be more quickly and more suitably dried for consumer use.

Generally in the kiln drying process for lumber, hot air is blown across sawn unseasoned lumber to remove water. The lumber is arranged in stacks with small spacers, commonly referred to as stickers, between each layer so that the hot air is distributed across the faces of the lumber. After passing through the stack of lumber, the hot humid air is either partially vented, or dehumidified, to remove the water vapor before being reheated and recycled though the stacked lumber.

Two common methods of kiln drying are distinguished by the method used for heating and removing of water vapor.

In the first method, standard kiln drying, heat is supplied to the kiln directly, by burning of fossil fuel or indirectly, with steam passing through heat exchangers associated with the kiln. Water vapor is removed from the kiln by venting a portion of the recycled humid air to the atmosphere. Unfortunately, in standard kiln drying water evaporation is energy intensive, and such a kiln requires steam spray for stress relief of lumber at the end of drying which also adds to the energy requirements.

In the second method, dehumidification kiln drying, heat is electrically supplied to the kiln initially by a resistance heater and then with a condenser. Water vapor is condensed and removed from the kiln as water. Dehumidification drying has many drawbacks: (1) the drying process is slow taking twice as long as standard kiln drying; (2) the kiln operates at temperatures below 120° F. because of limitations in the dehumidification equipment; (3) drying rates below 10% moisture are extremely slow and moisture contents of 6% required for furniture-grade lumber cannot normally be achieved; and (4) no capabilities for a humidification period following drying of the lumber required to relieve internal stresses which remain in the lumber are available.

Prior art patents and articles include the following.

"Solar dry kiln for tropical latitudes", William T. Simpson et al., Forest Products Journal, Vol. 34, No. 5, pp. 25–34, discloses a solar dry kiln having an insulated drying compartment attached to a horizontal external solar collector.

U.S. Pat. No. 4,432,147, issued Feb. 21, 1984 to Chen et al., discloses an energy efficient kiln using solar collectors and a refrigeration system that is useful for drying green lumber. Circulating air is heated by solar collectors and then by a condenser of a refrigeration system, passed in contact with lumber, and dehumidified by cooling across the evaporator of the refrigeration system before being reheated to start another cycle.

U.S. Pat. No. 4,831,747, issued May 23, 1989 to Roos et al., discloses a continuous drier for veneer. Temperature sensors and an infrared detector provide the veneer surface temperature to allow for determination of residual moisture of the veneer. The signal from the infrared detector is utilized in the control of blowers in the drying zones near the exit to provide more precise and reliable control in final moisture, allowing for better toleration of variations in dryer load, initial moisture, wood density, and sheet thickness.

U.S. Pat. No. 4,862,599, issued Sep. 5, 1989 to Brunner, discloses a process and apparatus for drying wood. The apparatus includes sensors for measuring wood moisture level and/or the velocity of the air to control air flow to achieve a desired air velocity profile in the plane of admission into a stack of wood to be dried.

U.S. Pat. No. 5,325,604, issued Jul. 5, 1994 to Little, discloses an automatic control system for a wood drying kiln, in which the weight of a representative sample positioned remote from the batch of wood to be dried is monitored to provide its moisture content. This moisture content is utilized to automatically adjust operational parameters within the kiln to provide desired drying conditions for the batch of wood.

To be of commercial value, wood must generally have a stability content and a moisture content of less than 9%, while kiln drying is the general approach utilized to achieve such moisture content, it is an energy expensive process.

Thus, in spite of these advancements in the prior art, there is still the need for improvement in apparatus for and process of drying timber.

Thus, there is another need for an apparatus for and process of drying timber that is energy efficient.

There is even another need in the art for an apparatus for and process of drying timber that is economically efficient.

There is still another need in the art for an apparatus and process of transporting a product while drying it.

There is yet another need in the art for an improved solar panel.

These and other needs in the art will become apparent to those of skill in the art upon review of this specification, including its drawings and claims.

SUMMARY OF THE INVENTION

It is an object of the present invention to provide for improved apparatus for and process of drying timber.

It is another object of the present invention to provide for an apparatus for and process of drying timber that is energy efficient.

It is even another object of the present invention to provide for an apparatus for and process of drying timber that is economically efficient.

It is still another object of the present invention to provide for an apparatus for and process of drying a product during its transportation.

It is yet another object of the present invention to provide for an improved solar panel.

These and other objects of the present invention will become apparent to those of skill in the art upon review of this specification, including its drawings and claims.

According to one embodiment of the present invention there is provided an apparatus for drying. The apparatus includes a chamber suitable for holding the item to be dried. The interior of the chamber generally includes curvalinear surfaces for facilitating air circulation, and further includes a warm end with a heat transfer surface and a cool end. A solar collector is positioned to provide heat to the heat transfer surface, with a fan positioned to provide air flow across the heat transfer surface. At the cold end is positioned a baffle to receive air flow from the heat transfer surface and direct it toward the warm end. In a further embodiment of this embodiment, the heat transfer surface is provided by the solar collector which is parabolic. In an even further embodiment of this embodiment, the fan is powered by a photo voltaic cell.

According to another embodiment of the present invention there is provided a method of drying a product. The method includes positioning the product within a chamber comprising curvalinear interior surfaces for facilitating air circulation, a heat transfer surface at one end of the chamber and a baffle at the other end of the chamber. The method further includes circulating air within the chamber across the heat transfer surface, toward the baffle, past the product, to dry the product.

According to even another embodiment of the present invention, there is provided a method of drying a product while transporting it from a first to a second point. The method includes positioning the product within a chamber comprising curvalinear interior surfaces for facilitating air circulation, a heat transfer surface at one end of the chamber and a baffle at the other end of the chamber. The method further includes circulating air within the chamber across the heat transfer surface, toward the baffle, past the product, to dry the product. The method additionally includes transporting the chamber from the first to second point during the drying step.

According to still another embodiment of the present invention, there is provided a solar panel having a convex portion which is oriented toward the sun during operation. Preferably, the solar panel further includes a concave portion which is oriented away from the sun during operation. Most preferably, the solar panel comprises a parabolic shaped cross-section.

According to yet another embodiment of the present invention there is provided an apparatus for drying. The apparatus includes a chamber suitable for holding the item to be dried. The interior of the chamber is non-rectangular and includes surfaces that are curved or shaped in a manner that facilitates air circulation and maximizes contact of the warm air with the item that is being dried. Materials of construction can include wood but can be of any other suitable material. In cross-sectional view, the drying chamber would appear to be roughly "egg shaped". A energy collector is positioned in such a manner that the sun's rays penetrate to a heat transfer surface and preferably is oriented in such a manner that a sloped surface faces the sun. Adjustable vents are provided on one end of the solar energy collector to allow entry of fresh air which in turn flows over the heat exchange surface. A fan is positioned at one or both ends of the heat exchange surface to assist in movement of air across the heat exchanger and into the drying chamber. This fan preferably is powered by photo-voltaic solar cells but may be powered by an external energy source. Air movement through and around he item to be dried is facilitated by placement of baffles at the entry and exist ends of the drying chamber. These baffles are oriented to maximize the contact of heated air with the item to be dried and divert the humid discharge air to a point of exhaust from the chamber. In one configuration, air flow is directed upward from the heat exchangers and across the top of the drying chamber followed by downward deflection using baffles or fins and through or around the item to be dried followed by exhausting through ports located beside or beneath the heat exchangers.

In an alternate embodiment of this yet another embodiment of the invention, baffles are used to direct the heated air flowing from the heat exchangers downward, then around or through the item to be dried followed by exiting from the chamber through air exhaust ports placed on or near the top of the drying chamber.

Air flow in the upward or downward direction may be assisted using one or more fans that are powered by photo-voltaic solar cells or by external energy sources. Batteries or heat absorption devices may be used to store solar energy for use during times when solar power is insufficient to heat the system or power the fans. One or more fans may be used to optimize the flow of external air into the units as well as recirculating warm air through the drying chamber and forcing moist air from the drying chamber.

The invention further provides a method of drying whereby the item to be dried is positioned within a drying chamber having a non-rectangular cross-section in the direction of air flow comprised of surfaces that are curved or shaped in a manner that facilitates air circulation and maximizes contact of the warm air with the item that is being dried. The method further includes recycling the air within the chamber across the heat exchange surface and around or through the item to be dried.

The preferred configuration of the solar energy collector system of this yet another embodiment is to have a heat exchange surface which maximizes its exposure to the sun when in operation with the surfaces of the solar energy collector and heat exchange surface are oriented toward the sun during operation. Preferably, the solar energy panel comprises a parabolic shaped cross-section, although other shapes, including flat, may be used. Also, preferably, the solar panels are not insulated on the side opposite the sun to allow heat to radiate from the back of the panel and act as an additional heat source. The area directly under the solar energy collector unit is identified as a radiant heat section of the drying chamber.

According to even still another embodiment of the present invention, there is provided a drying apparatus which generally includes a frame defining a drying chamber suitable for holding an item or items to be dried, said chamber having a non-rectangular cross-sectional shape in the direction of air flow comprised of curvilinear or similarly shaped surfaces to facilitate air circulation. The drying apparatus further includes a solar energy collector and heat exchanger located on one end of the drying chamber and positioned to cause heated air to flow into the top of the drying chamber and then downward along the back of the chamber. The drying apparatus even further includes a system of baffles or deflectors positioned at the end of the drying chamber opposite the heat exchanger that causes heated air to flow downward along the back of the chamber and then be directed through and around the mass of items to be dried. The drying apparatus finally includes one or more openings that allow moist air to exit the chamber at points beneath the heat exchanger.

According to even yet another embodiment of the present invention, there is provided a drying apparatus which generally includes a solar energy collector and heat exchanger located on one end of the drying chamber and positioned to cause heated air to flow toward the outlet end of the solar energy collector. The drying apparatus also includes system of baffles positioned at the outlet end of the solar energy collector and heat exchanger that causes heated air to flow downward beneath the heat exchanger where it is distributed further into and around the mass of items to be dried. The apparatus even includes a system of baffles along the end of the chamber opposite the solar energy collector that causes air to flow upward along the end of the chamber. The apparatus further includes one or more exhaust ports that allow moist air to exit near the top of the drying chamber.

In the above two embodiments: (1) the solar energy collector may consist of a heat exchange surface covered by a transparent or translucent material to allow penetration of visible, infra-red, and ultraviolet light to subsequently contact the heat exchange surface; (2) the heat exchange surface may be corrugated.; (3) the cover and heat exchanger of the solar energy collector may have parabolic or otherwise semi-circular shaped cross-sections oriented convex toward the sun's rays and concave toward the drying chamber; and/or (4) the solar energy collector allows movement of air between the corrugated panel and the translucent or transparent cover material.

DETAILED DESCRIPTION OF THE INVENTION

The present invention will now be discussed by reference to FIGS. 1A–5.

Figure 1A:
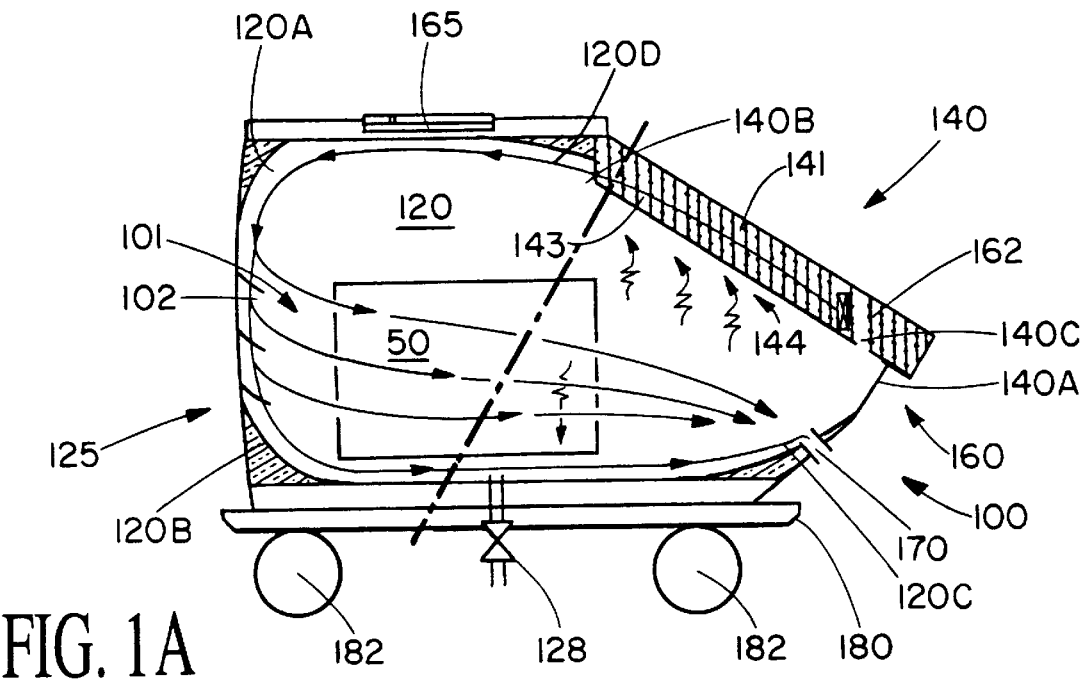
FIG. 1A shows a cross-sectional view of one embodiment of the present invention showing kiln 100, including drying chamber 120, solar energy collector 140, heat exchange surface 141, air inlets 160, and support carriage 180 in which air flows upward through the heat exchanger 140 and from radiant heat section 144, horizontally across the top of the drying chamber 120, horizontally through the drying chamber 120, and exhausts through ports 170 located in the lower section of the drying chamber.
Figure 3:
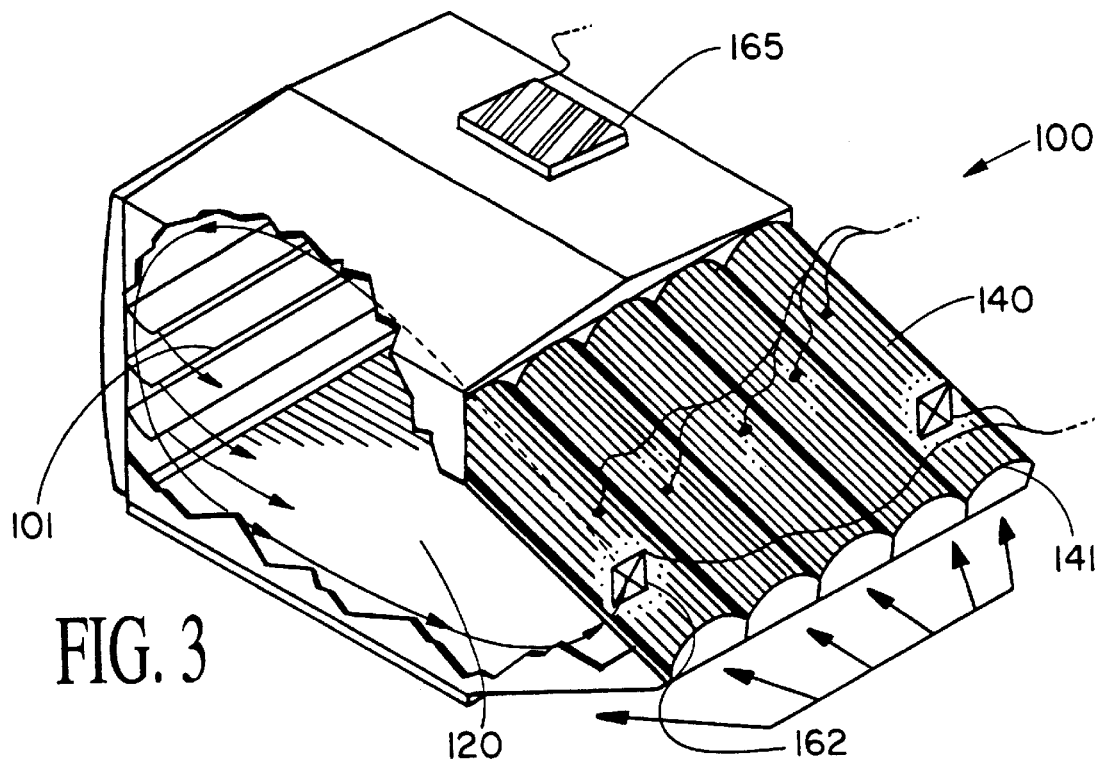
FIG. 3 is an isometric partial cutaway view of on embodiment of the present invention showing kiln 100, including chamber 120, heating system 140, circulation system 160.

Referring first to FIG. 1A, a cross-sectional cutaway view of kiln 100 of the present invention, and additionally to FIG. 3, an isometric partial cutaway view of the kiln 100 of the present invention, there is shown one embodiment of the present invention showing kiln 100, including chamber 120, heating system 140, circulation system 160, and support carriage 180.

Figure 2:
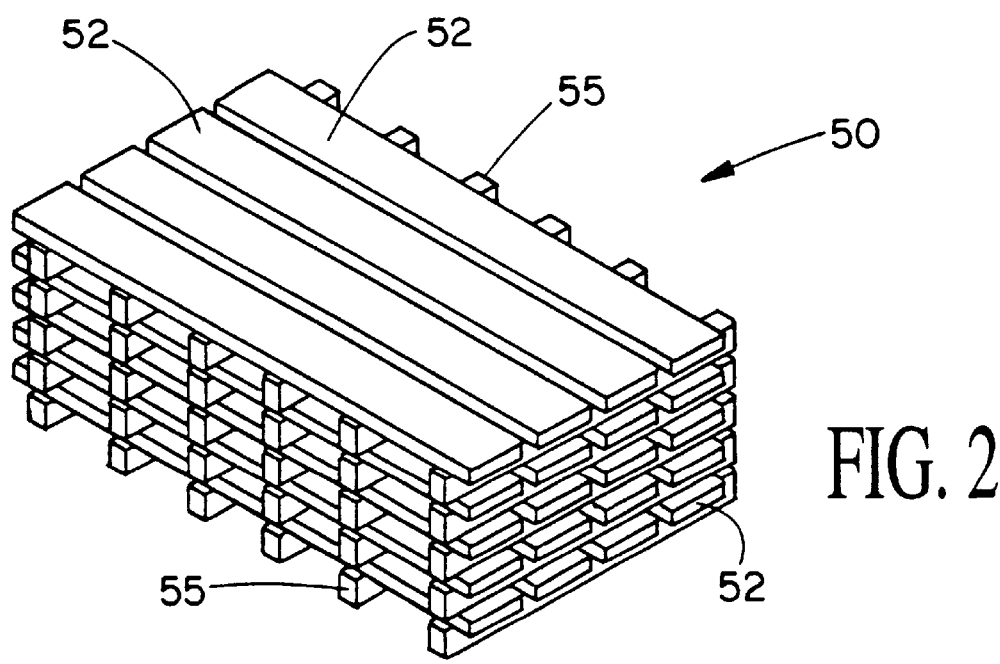
FIG. 2 is an illustration showing a stack of lumber 50, having individual boards 52, and stickers 55 to allow air flow between boards 52.

Chamber 120 is sized to hold a desired amount of raw or green lumber 50 to be processed. Referring now to FIG. 2, there is shown a stack of lumber 50, showing individual boards 52, and stickers 55 to allow air flow between boards 52. This stack of lumber 50 is positioned within wood chamber 120, preferably with individual boards oriented perpendicular to the sides of the kiln and to the direction of air flow.

Heating system 140 may comprise any suitable means for heating the circulating air 101 within chamber 120, including gas or electric powered heating systems. Preferably, heating system 140 includes one or more solar collectors 141 to provide solar heat to circulating air 101 circulating within wood chamber 120. While solar collectors 141 may be of any suitable shape, it is preferred that solar collectors 141 be somewhat elongated with a parabolic surface facing the sun as shown.

Figure 4:
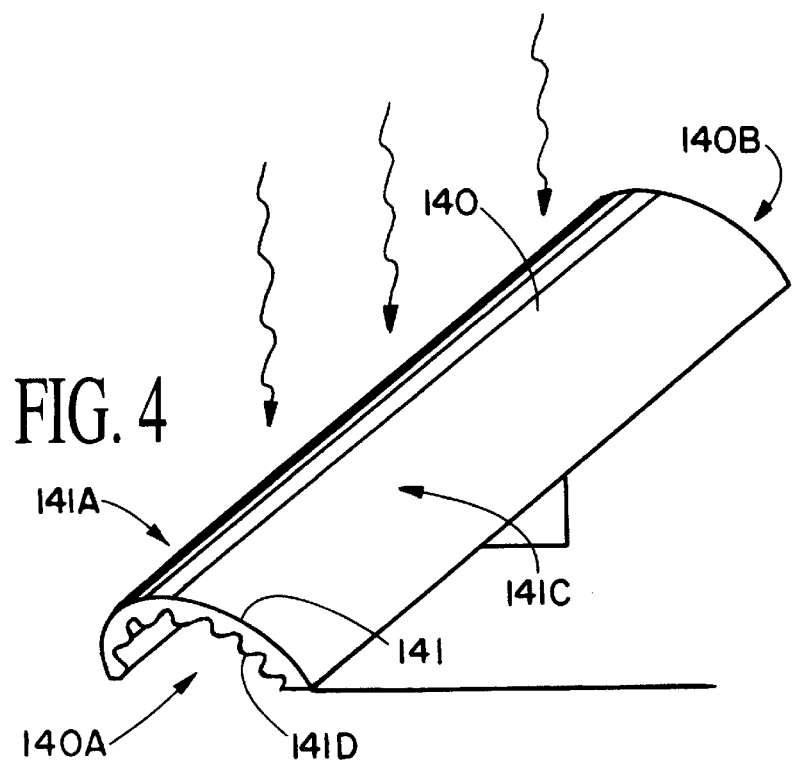
FIG. 4 is a schematic illustration of the preferred configuration of a solar energy heat collection system.

The solar collectors 141 utilized in the present invention may be of any suitable geometric configuration. Referring now to FIG. 4, generally, solar collectors 141 will have a convex portion 141A which is oriented toward the sun during operation. Preferably, the solar energy collector comprises a parabolic cross-section as shown in FIG. 4. The preferred configuration of the solar energy collector further includes an outer shield 141C which allows maximum penetration of the sun's rays including visible, infra-red and ultraviolet light. The outer shield 141C typically will be a flexible plastic material that is easily formed into a parabolic or curved configuration. The preferred configuration further includes an inner heat exchange surface 141D comprised of a metal, ceramic, glass, or plastic material that is shaped to maximize the surface are exposed to sunlight passing through the outer shield 141C. The purpose of the heat exchanger is to absorb the sun's rays so that the air above and below the heat exchanger is warmed by radiant heat transfer. While smooth surfaces are acceptable, the preferred surface has a corrugated or otherwise tortuous surface.

Solar energy collectors 140 ideally are placed on a slope ranging from 30 to 65 degrees from horizontal as illustrated in FIGS. 1, 3, and 4 to enhance air flow by convection, but can be placed flat or vertical with some loss of efficiency of solar energy collection. A series of solar energy collection modules are placed side by side to provide the capacity needed for a given size of kiln.

For internal circulation of air, it is desired that the rising warmer air rise at one end of the kiln and the falling cooler air fall at the other end of the kiln. Thus, solar collectors 141 are positioned to provide heat only on one side of kiln. The heat exchange surfaces 143 of solar collectors 141 are generally positioned so that the circulation entry point 140A is lower than circulation exit point 140B, to take advantage of the natural direction of air circulation.

Air entering the solar energy collectors 141 at air intakes 140A, rises in the solar energy collector as it warms, travels across the inside top of the drying chamber by the forces of natural convection or as assisted by fans 162, and is deflected by directional air fins 125 downward along the inside face 120 of the back panel of the kiln 100, then horizontally through the wood stack 50 to be dried. The air then is cooled by absorption of heat in the wood of stack 50 and by evaporation of water from the boards and finally is exhausted partially through exhaust ports 170. Internal circulation of air may be enhanced further by placement of recirculation ports 140C at the lower end of the solar energy collectors inside the drying chamber. Thus, solar energy collectors 141 are positioned to provide heat only to one end of the kiln. The heat exchange surfaces 143 of solar energy collectors 141 preferably are positioned so that air entry point 140A is lower than the air exit point 140B to take advantage of natural convection due to heated air rising through the solar energy collector.

To further encourage the circulation of the air 101, kiln 100 may be equipped with one or more fans 162 which may be powered by any suitable energy source. Most conveniently, fans 162 are powered by one or more photovoltaic cells 165 which convert solar energy into electricity. The fans 162 are positioned to encourage air flow past heat exchange surfaces 143 of solar collectors 141 in the natural direction of the air circulation.

To still further encourage the circulation of air 101, the solar energy collector 141 may be equipped with one or more fans 162 which may be powered by any suitable energy source. Most conveniently, and most economically, fans 162 are powered by one or more photo-voltaic cells 165 which convert solar energy into electricity. Fans 162 are positioned at any point long the solar energy collector to enhance air flow past heat exchange surface 143.

Fans 162 are useful to initially start the circulation of air within chamber 120. Generally, once circulation is started, some circulation is maintained by the rising of the hot air and falling of cold air. This circulation is further enhanced by the curvilinear or non-rectangular shape of the drying chamber and by the placement of baffles or deflection fins 125 located within and along the inside walls of the drying chamber. However, it is preferred that fans 162 be utilized to maintain a faster rate of circulation.

Wood chamber 120 generally includes curvalinear surfaces to encourage the circulation of air within chamber 120. For example, wood chamber 120 includes curvalinear surfaces 120A, 120B, 120C and, 120B and 120E. Most preferably, chamber 120 is "egg" shaped.

Wood chamber 120 may also include one or more directional air fins 125 to direct the circulating air toward wood stack 50 and back to inlet 140A. Preferably, air fins 125 direct portions of the circulating air 101 over the top, middle and bottom sections of wood stack 50.

The operating temperature in kiln 100 will depend upon the ambient temperature and amount and quality of sun striking solar panels 141. It is preferable to insulate kiln 100 to reduce energy losses. Generally, the operating temperature will range from about 90° F. to about 120° F., preferably in the range of about 95° F. to about 115° F., more preferably in the range of about 105° F. to about 110° F.

One or more drains 128 may be positioned in the floor of kiln 100 to allow for drainage of liquid.

To provide for ease of transporting kiln 100, support carriage may optionally be provided with wheels 182, which allow it to be pushed, towed or self-powered from site to site.

Figure 1B:
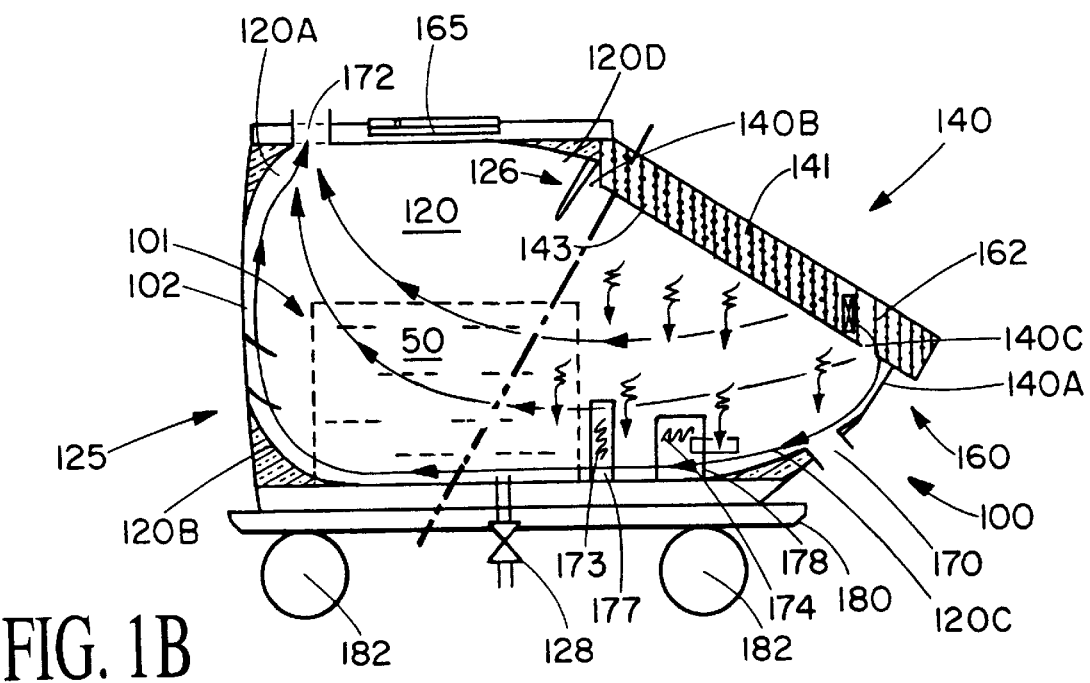
FIG. 1B shows a cross-sectional view of a second embodiment of the present invention showing kiln 100, including drying chamber 120, solar energy collector 140, heat exchange surface 141, air inlets 160, and support carriage 180 in which air is deflected downward from the heat exchangers by baffle 126 and into the radiant heat section of the drying chamber, then flows horizontally through and around the item to be dried upward across the inside face of back panel 102 of drying chamber 120, and exits through exhaust port 172 located in the upper section of the drying chamber.
Figure 1C:
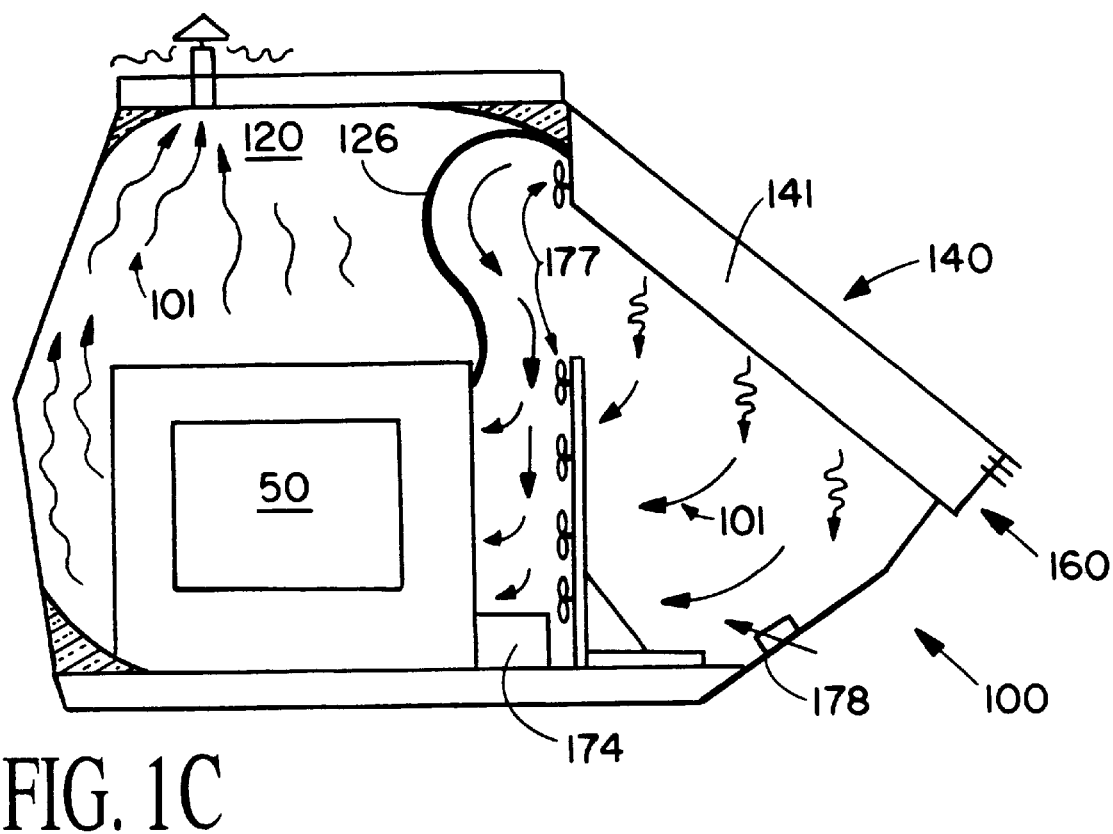
FIG. 1C further illustrates an alternate embodiment whereby external air is forced into the drying chamber through fan 178 and exits through exhaust ports 172 and/or 170 located in the outer sections of the drying chamber. A heater 174 may be located near fan 178 to provide auxiliary heat in the event that solar energy is insufficient to meet all heating requirements. Additionally, fan 177 and heater 173 provide assistance in moving and heating internal air within drying chamber 120.
Figure 1D:
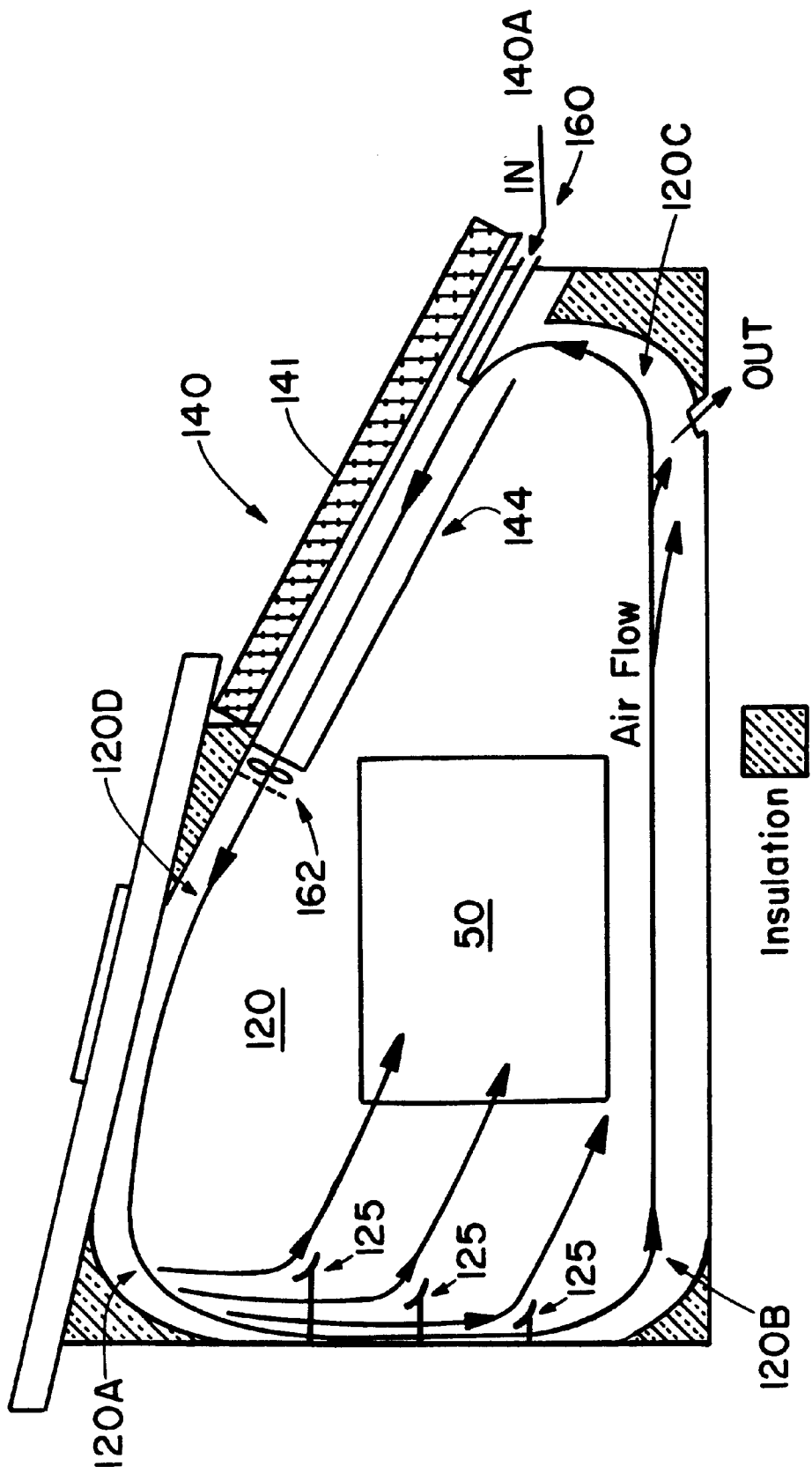
FIG. 1D is a cross-sectional cutaway view of kiln 100 of the present invention.

Referring to FIG. 1D, a cross-sectional view of kiln 100 and additionally to FIG. 3, an isometric partial cutaway view of the kiln 100, there is shown one embodiment of the present invention, for a wood drying application showing kiln 100, including solar collector system 140, drying chamber 120 with radiant heat section 144, and support carriage 180. Drying chamber 120 preferably includes a non-rectangular cross-section to encourage the circulation of air within drying chamber 120. In the embodiment shown in FIG. 1D, drying chamber 120 includes curvilinear surfaces 120A, 120B, 120C, and 120D and 120E so that the chamber becomes somewhat "egg shaped" with a smaller end beneath the solar energy collectors and a larger end opposite the solar energy collector. While surfaces 120A, 120B, 120C, and 120D and 120E are shown in a curvilinear configuration, a series of bends can be used to provide similar effects. Drying chamber 120 also includes one or more directional air fins or baffles 125 to deflect the circulating air so that it passes uniformly over the top, middle, and bottom sections of wood stack 50.

A reverse flow embodiment is illustrated in FIG. 1B which shows a kiln 100 in which the warm air exiting solar energy collectors 141 is deflected downward by placing a baffle 126 between the outlet end of the solar energy collector and the top of wood stack 50. Baffle 126 may be straight or curved as needed to enhance downward flow of the warm air. Warm air from the radiant heat section 144 of drying chamber 120 subsequently is forced through the wood stack 50 by convection caused by upward flow of moist air across directional fins 125 at the back of drying chamber 120 and exits through one or more exhaust ports 172 located in the upper surface of the kiln 100. Circulation may be assisted by fans 177 located within the drying chamber. Auxiliary heat may be applied by heating elements 173 located separately or in conjunction with fans 177.

A further embodiment of the invention is illustrated further in FIG. 1C wherein an auxiliary fan 178 is used to provide enhanced air flow into the drying chamber from outside kiln 100. A heater 174 may be added to provide auxiliary heating in the event the solar energy collectors do not provide the necessary amount of heat.

Figure 5:
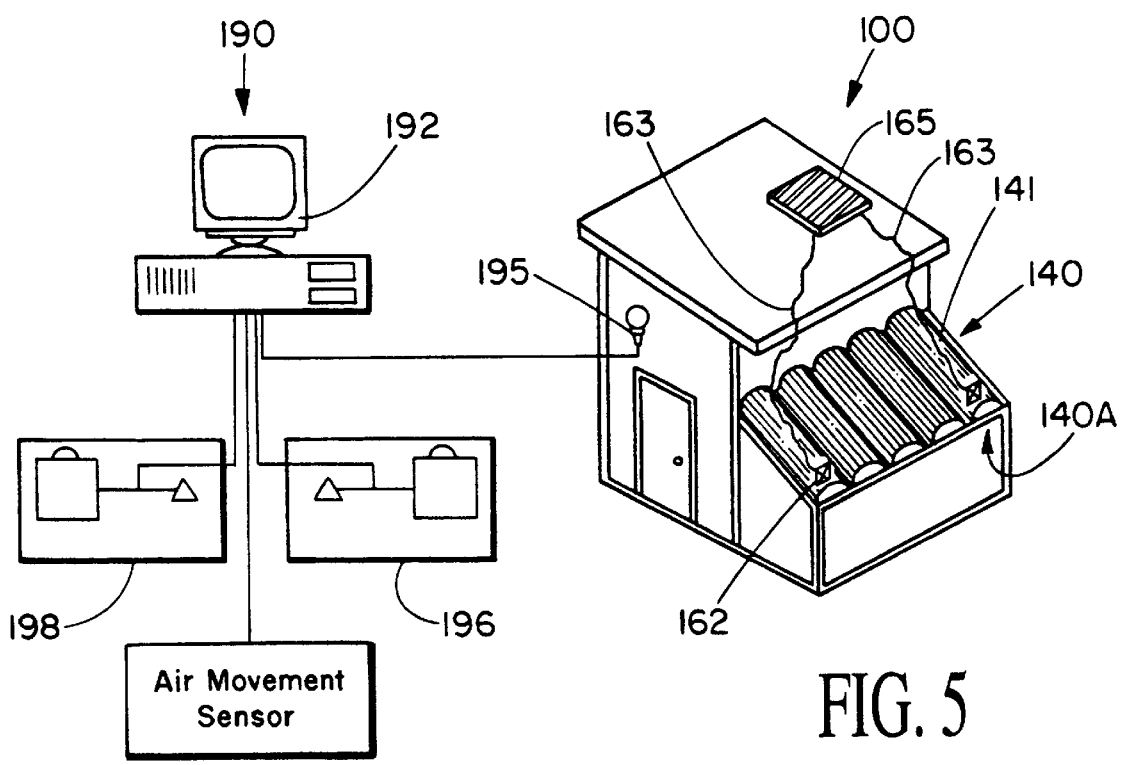
FIG. 5 is a schematic representation of the data gathering system utilized for collecting data in the Examples.

FIG. 5 illustrates the optional use of computers to monitor the status of the items to be dried; to regulate the air inlet and exhaust ports and to control internal recycle of air; to optimize the temperature and humidity within the drying chamber; and to minimize energy consumption during periods when auxiliary heating and air circulation are used.

An important and significant feature of the present invention is the cyclic heating and cooling provided by solar heating during periods of sunlight and cooling during period of darkness. This alternating heating and cooling allows moisture to move from the outer surfaces of the boards to be dried during heat cycles and to equalize within the boards during cooling periods, thereby essentially eliminating the cracking and checking of lumber experienced with other types of kilns.

Costs of solar kiln 100 and associated appurtenances will vary with the types of material used, labor costs for assembly, and the incorporated features but are expected to be no greater than the costs of alternative types of kilns. Energy costs for the present invention will essentially be eliminated when the kiln is operated using solar energy only. Auxiliary electric heaters and circulating fans used to assist the solar drying functions are expected to add less than $0.10 per board foot of dried lumber which is less than 20% of the energy costs typically associated with non-solar drying.

Kiln 100 may also be utilized during the transport of lumber to provide for drying during transportation. For example, kiln 100 may be utilized onboard ships during transoceanic shipping.

While the present invention has been illustrated mainly with reference to the drying of lumber, the present invention may be utilized in the drying of other products. Non-limiting examples of other products which may be dried include fruits, flowers and grains.

The present invention may also be utilized not only to dry, but to heat. As non-limiting examples, the present invention may be utilized to heat pickle brine in a pickling process, to provide heat to the water and interior of a hydroponic garden, or to heat buildings.

EXAMPLE

The following example is provided merely to illustrate the embodiments of the present invention and is not intended to limit the scope of the claims in any manner.

Example 1

A kiln 100 was constructed basically as illustrated in FIG. 1, except as noted herein. Kiln 100 is equipped with photovoltaic cell 165 placed on top of the roof. Photo-voltaic cell 165 transforms sunlight into electrical power provided by wires 163 to the two fans 162 located inside the outer two of the five parabolic-shaped solar heat collectors 141. A vane-type air flow sensing element 195 is utilized to calculate the air flow speed of air 101 circulating inside the kiln.

The monitoring system 190 also includes two Omega relative humidity and temperature transmitters 196 and 198—one installed inside the kiln and one outside. FIG. 4 is a schematic of monitoring system 190 utilized. The sensors 196 and 198 transmit relative humidity and temperature directly to a computer 192. Readings are taken every six seconds and recorded every five minutes. Readings are saved on a floppy disk and then utilized to create weekly graphs that are valuable in computing drying time.

Moisture content in the wood each week is manually determined with a percent wood moisture meter having a range of 30 percent and as low as 6 percent. Determination can be made of the interaction of moisture and wood inside and outside conditions using these weekly readings combined with the weekly computer sensor readings.

For this example, the solar kiln 100 is constructed of standard 2"×4" studs that are 8' tall. The floor, due to the weight of 1,000 bd. ft. of raw lumber, required 2"×8" floor joists with a ¾" covering. Studs and joists were placed on 16" centers. The roof is corrugated tin that slopes 12" to the front. The slope allows water to run off while, at the same time, creating an inside air stream that flows up from end 140B of the collectors 141, and then down behind and through the lumber. The roof overhangs the structure by 24".

The collectors 141 were constructed of 2"×6" redwood with a covering of Kalwall. Kalwall was selected as it is specifically manufactured to eliminate unwanted rays while admitting the sun's wanted heat. The inside base of collectors 141 consists of Masonite covered with 16 gauge sheet metal which is painted black. There is a distance of 4" between the Kalwall and the sheet metal backing, which consisted of corrugated sheet metal to increase the heat transfer surface.

The bottom of 141 collectors has an opening 3" high and 14" long. The top end of each collector opens totally onto the roof line. The insulation is white Styrofoam 2" thick and 16" wide and fits between the 2"×4" studs and roof rafters.

Two wooden doors swing out on each side of the kiln 100 and close into standard door jams. 4'×8' sheets of T1-11 cedar siding serve as the outer skin. The total structure is built on two 6"×8" planks that act as a barrier between the ground and the floor joints. These are also incorporated into the design to act as slides in case we need to move the structure.

An estimate of 994 board feet was air dried to an average moisture reading of 10.5%. The kiln was loaded with both a front and back stack of oak boards. The 8.5 feet boards were 1 inch thick with random widths. Data was gathered over 28 days. The wood was acceptable for commercial use (less than 9% moisture) within 10 days. Moisture and temperature readings are provided in the following Tables 1 and 2, respectively, for both the front and back stacks for the top, 8th, 24th and bottom boards (counting from top).

TABLE 1

| Moisture Data for Front/Back stacks | | | | |
|---|---|---|---|---|
| Days from loading | Top | 8th | 24th | bottom |
| 9 | 5/5 | 8/6.5 | 8.5/7 | 8.5/7.5 |
| 14 | 5/5 | 6.5/5 | 8.5/5 | 8.5/6.75 |
| 20 | 5/5 | 5/5 | 7/5 | 7.5/6.25 |
| 28 | 5/5 | 5/5 | 5/5 | 5/5 |

TABLE 2

Temperature and Humidity Data for Front/Back stacks

| Days from loading | Time of day | Temp$_{IN}$ | Temp$_{OUT}$ | Humidity$_{IN}$ | Humidity$_{OUT}$ |
|---|---|---|---|---|---|
| 2 | 1:00 pm | 79 | 72 | 35 | 50 |
| 3 | 9:00 pm | 64 | 59 | 48 | 84 |
| 4 | 5:30 pm | 94 | 77 | 32 | 60 |
| 5 | 4:30 pm | 108 | 86 | 28 | 55 |
| 9 | 2:00 pm | 118 | 85 | 18 | 46 |
| 10 | 8:30 am | 71 | 67 | 41 | 88 |
| 11 | 4:30 pm | 108 | 83 | 24 | 52 |
| 12 | 5:00 pm | 110 | 82 | 23 | 57 |
| 15 | 3:45 pm | 108 | 81 | 16 | 44 |
| 16 | 3:00 pm | 108 | 79 | 15 | 47 |
| 17 | 6:00 pm | 108 | 85 | 24 | 54 |
| 18 | 4:45 pm | 116 | 91 | 20 | 51 |
| 19 | 5:00 pm | 117 | 95 | 20 | 44 |
| 22 | 2:30 pm | 108 | 75 | 10 | 35 |
| 23 | 1:55 pm | 108 | 83 | 11 | 38 |
| 24 | 5:00 pm | 114 | 87 | 15 | 41 |
| 25 | 5:45 pm | 104 | 80 | 16 | 43 |
| 26 | 7:00 pm | 99 | 76 | 20 | 56 |
| 27 | 4:20 pm | 105 | 84 | 21 | 59 |
| 28 | 5:00 pm | 96 | 65 | 15 | 33 |
| 31 | 5:30 pm | 98 | 62 | 19 | 44 |
| 32 | 4:30 pm | 103 | 75 | 12 | 29 |
| 33 | 5:00 pm | 81 | 64 | 20 | 61 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A drying apparatus comprising:
   (a) a frame defining a chamber suitable for holding an item to be dried, said chamber comprising curvalinear surfaces for facilitating air circulation, and further comprising a warm end with a heat transfer surface and a cool end;
   (b) a heater positioned to provide heat to the heat transfer surface;
   (c) a fan positioned to provide air flow across the heat transfer surface; and
   (d) a baffle positioned within the chamber at the cold end to receive air flow from the heat transfer surface and direct it toward the warm end.

2. The apparatus of claim 1 wherein the heater comprises a solar collector.

3. The apparatus of claim 2 wherein the solar collector is a parabolic-shaped solar collector.

4. The apparatus of claim 1 wherein the fan is powered by a photo voltaic cell.

5. A method of drying a product comprising:
   (a) positioning the product within a chamber comprising curvalinear interior surfaces for facilitating air circulation, a heat transfer surface within and at one end of the chamber and a baffle within and at the other end of the chamber; and
   (b) circulating air within the chamber across the heat transfer surface, toward the baffle, past the product, and back across the heat transfer surface.

6. A method of transporting a product from a first point to a second point, the method comprising:
   (a) positioning the product within a chamber comprising curvalinear interior surfaces for facilitating air circulation, a heat transfer surface at one end of the chamber and a baffle positioned near the heat transfer surface;
   (b) circulating air within the chamber across the heat transfer surface, toward the baffle, to beneath the heat transfer surface; and
   (c) transporting the chamber between the first and second points, during operation of step (b).

7. The method of claim 6 further including providing heat to the heat transfer surface by a solar collector.

8. The method of claim 6 further including providing heat to the heat transfer surface by a parabolic-shaped solar collector.

9. The method of claim 6 further including circulating air in step (b) with a photo voltaic cell powered blower.

10. The method of claim 6 wherein the chamber further comprises a cool end opposite the one end, and circulate air in step (b) upwardly at the one end and downwardly at the cool end.

11. The method of claim 6 wherein the chamber comprises a non-rectangular cross-section.

12. The method of claim 6 wherein the chamber is egg shaped.

* * * * *